United States Patent [19]

Martinez Velazquez

[11] Patent Number: 5,487,447

[45] Date of Patent: Jan. 30, 1996

[54] SYSTEM FOR FACILITATING AN OIL CHANGE AND/OR AN OIL FILTER CHANGE IN INTERNAL COMBUSTION ENGINES

[76] Inventor: Manuel J. Martinez Velazquez, Uncastillo, 7, 3-A, Zaragoza, Spain, 50008

[21] Appl. No.: 248,087

[22] Filed: May 9, 1994

[63] Continuation of PCT/ES93/00079, Sep. 22, 1993

[30] Foreign Application Priority Data

| Sep. 22, 1992 | [ES] | Spain | ..................................... 9201887 |
| Oct. 22, 1992 | [ES] | Spain | ..................................... 9202109 |
| Mar. 16, 1993 | [ES] | Spain | ..................................... 9300552 |

[51] Int. Cl.⁶ .................................................. F16C 3/14
[52] U.S. Cl. ........................ 184/1.5; 123/196 R; 141/98
[58] Field of Search ........................ 184/1.5; 123/196 R; 141/98

[56] References Cited

U.S. PATENT DOCUMENTS

| 3,720,287 | 3/1973 | Martel . | |
| 3,743,053 | 7/1973 | Kuklewicz | ................................ 184/1.5 |
| 4,095,673 | 6/1978 | Takeuchi | ................................ 184/1.5 |
| 4,205,758 | 6/1980 | Johnson . | |
| 4,508,195 | 4/1985 | Millet . | |
| 4,674,456 | 6/1987 | Merritt | ..................................... 184/1.5 |
| 4,901,693 | 2/1990 | DeGrazia, Jr. . | |
| 4,951,784 | 8/1990 | Bedi | ............................................ 184/1.5 |
| 5,074,380 | 12/1991 | Bedi et al. | ........................... 123/196 R |
| 5,090,376 | 2/1992 | Bedi | ............................................ 184/1.5 |
| 5,263,445 | 11/1993 | Bedi et al. | ................................ 184/1.5 |

FOREIGN PATENT DOCUMENTS

| 0337593 | of 0000 | European Pat. Off. . | |
| 2554164 | of 0000 | France . | |
| 2252462 | 10/1972 | Germany | ................................ 184/1.5 |
| 0048700 | 3/1986 | Japan | ....................................... 184/1.5 |
| 0016115 | 1/1988 | Japan | ....................................... 184/1.5 |
| 6042327 | 2/1994 | Japan | ....................................... 184/1.5 |
| 7907221 | of 0000 | Netherlands . | |
| 1027250 | of 0000 | United Kingdom . | |

Primary Examiner—Thomas E. Denion
Attorney, Agent, or Firm—Darby & Darby

[57] ABSTRACT

System for facilitating the changing of the oil and the oil filter in internal combustion engines, the system being comprised of an external unit for extracting the spent oil and filling in the new oil, and oil filter support which provide for its operation at a remote position from the engine unit while facilitating the changing thereof and a system of hydraulic conduits for connecting the filter support to the engine unit and the crankcase to the external auxiliary unit.

22 Claims, 11 Drawing Sheets

005,487,447

SYSTEM FOR FACILITATING AN OIL CHANGE AND/OR AN OIL FILTER CHANGE IN INTERNAL COMBUSTION ENGINES

This application is a continuation of PCT/ES93/0079, Sep. 22, 1993.

The instant invention relates to a system for faciliting an oil change and/or an oil filter change in internal combustion engines in a mainly automatic easy and fast manner which comprises a connecting means which is connected to the oil outlet of the crankcase in substitution of the conventional plug closing the motor oil outlet which connecting means extends into a conduct, removable oil extraction and refilling means being connectable to said conduct, a support for the oil filter in which said filter is placed remotely from its conventional position in an inverted vertical position, said support being connected to the conventional site of the oil filter bv a connecting plug and two conducts allowing circulation of oil from the motor through the remotely located oil filter.

Presently, the change of oil and oil filters of combustion engines is a quite cumbersome, untidy and slow procedure. Thus, change of motor oil is generally done by hand by unscrewing the outlet plug of the crankcase, letting used oil run ot of the box by gravity until it is empty, screwing the plug in again and refilling the motor block through the corresponding inlet opening whilst change of the oil filter is generally done by unscrewing it from its position in the motor block which is generally not located at an accessible site.

These conventional manual procedures have the disadvantages that they are slow, i.e., they take at least 15 minutes, require, in the case of motor vehicles, an elevator or a service pit to have access to the oil outlet plug of the crankcase, untidy because they always lead at least to oil smearing the operator's hands and oil flowing to the floor thereby causing serious pollution.

Furthermore, refilling the motor block with oil through the conventional upper oil inlet has the disadvantage that the oil being poured in rests for a certain time on the inner port iotas of the motor before reaching the oil box so that to achieve the correct filling oil level implies awaiting that practically all oil has dropped into the crankcase after various filling steps. This is even slower than 15 minutes so that, in general, too little or more too often too much oil is refilled which results not only in a possible waste of oil but also to pollution as the excess oil is unnecessarily burned or thrown out of the engine.

The convention manual oil filter change at its conventional generally quite unaccessible location is, on the one hand, slow and, on the other, a rather untidy job as to reach the oil filter located at a site where it is surrounded by engine portionscovered with diret the operator becomes smeared with such dirt.

The engine solves these drawbacks of conventional systems and offers the following advantages as well:

a) No expensive and energy consuming elevators for oil change of motor vehicles is necessary so that oil change may be performed anywhere.

b) The number of steps for motor oil change are substantially reduced in comparison with conventional systems whereby said the exchange is expedited.

c) Oil can be removed by suction instead of gravity and filled in under pressure through the conventional oil outlet so that the change process is expedited and the filling level can be adjusted.

d) The system can be operated with special substances for cleaning the inside of the engine being filled in and removed as if it were conventional motor oil.

e) The oil filter is placed at an accessible site and can be replaced in about 20 seconds i.e. substantially faster than by conventional systems.

f) No waste or new oil is spread away so that pollution is avoided and the operator does not become smeared with oil.

g) Waste oil can be centrally stored.

h) The amount of replacement oil can be automatically controlled and adjusted whereby filling of excessive replacement oil amounts in the engine are avoided.

i) The system can be connected to electric and data processing systems to control the amounts to be filled in various motor types, measure and processing of replacement oil consumption and waste oil collection, stock management of replacement oil, etc.

All in all, the claimed system is inexpensive, flexible, extremely fast, environment-friendly and allows the incorporation of a pluraltiy of additional functions concerning control of replacement oil filling levels and storage and management of waste oil stocks.

One way of carrying out the invention is described hereinafter with reference to the drawings illustrating non-restrictive embodiments of the invention within the scope of the claims.

Figure 1:
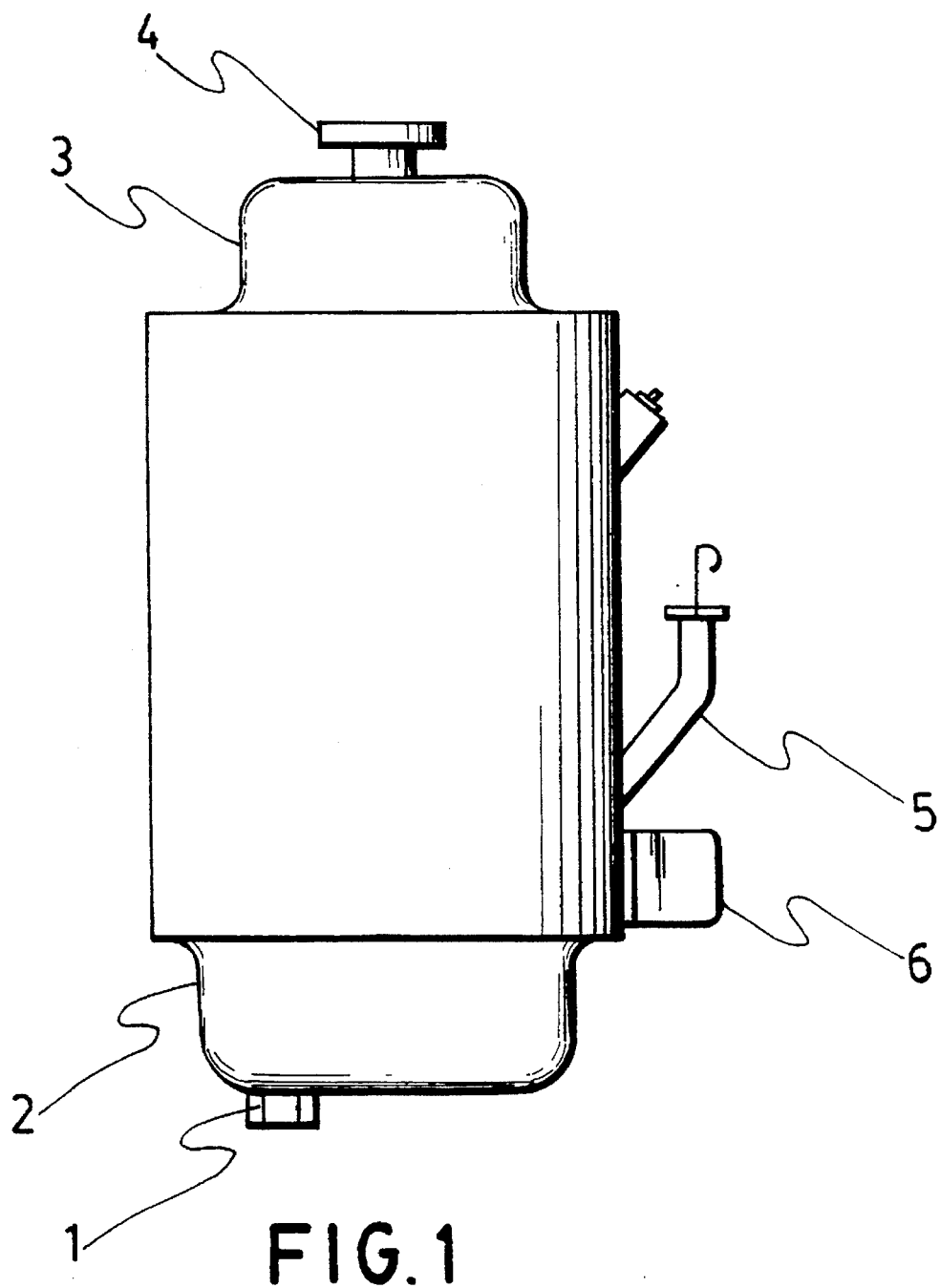
FIG. 1 is a schematic side view of a conventional combustion engine showing the site of the oil outlet plug, and the oil filter, as well as the oil level detecting rod that deinfes the oil inlet of the crankcase.

According to FIG. 1, conventional combustion engines have a plug 1 screwed into the outlet of the crankcase 2 which must be removed for extraction of used oil and screwed in again thereafter, and a cap 4 covering the oil inlet located at the upper portion 3 of the engine through which replacement oil is conventionally filled in. A conventional tube 5 for housing the oil level detecting rod and an oil filter 6 located at its conventional site are also shown.

Figure 2:
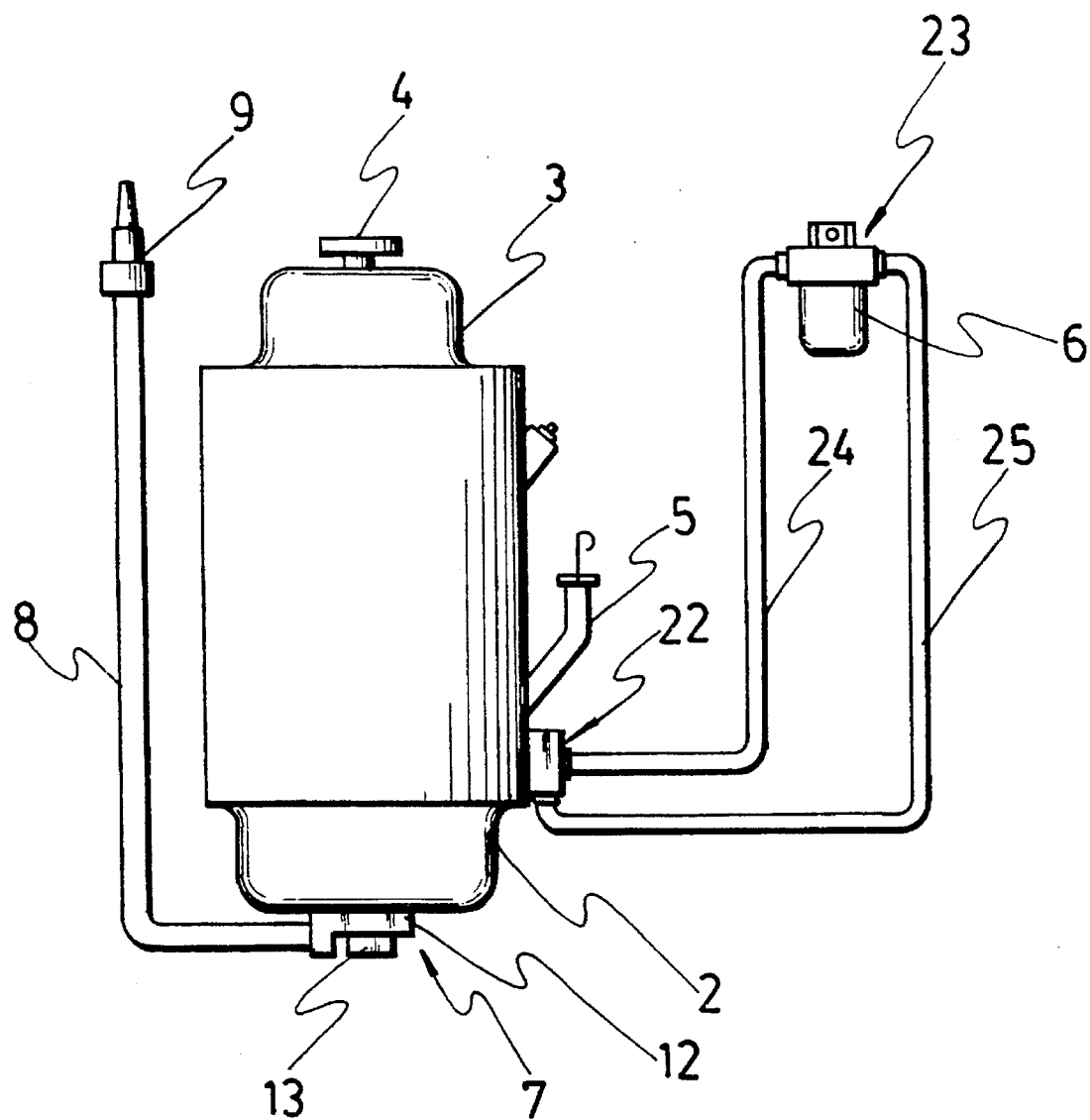
FIG. 2 is a schematic view of the system in accordance to the instant invention when applied to conventional combustion engines.

FIG. 2 shows the system of the invention assembled to a conventional engine, according to which the conventional plug is replaced by a connecting means 7 having a duct 8 the upper portion of which ends in a rapid socket 9.

Figure 3:
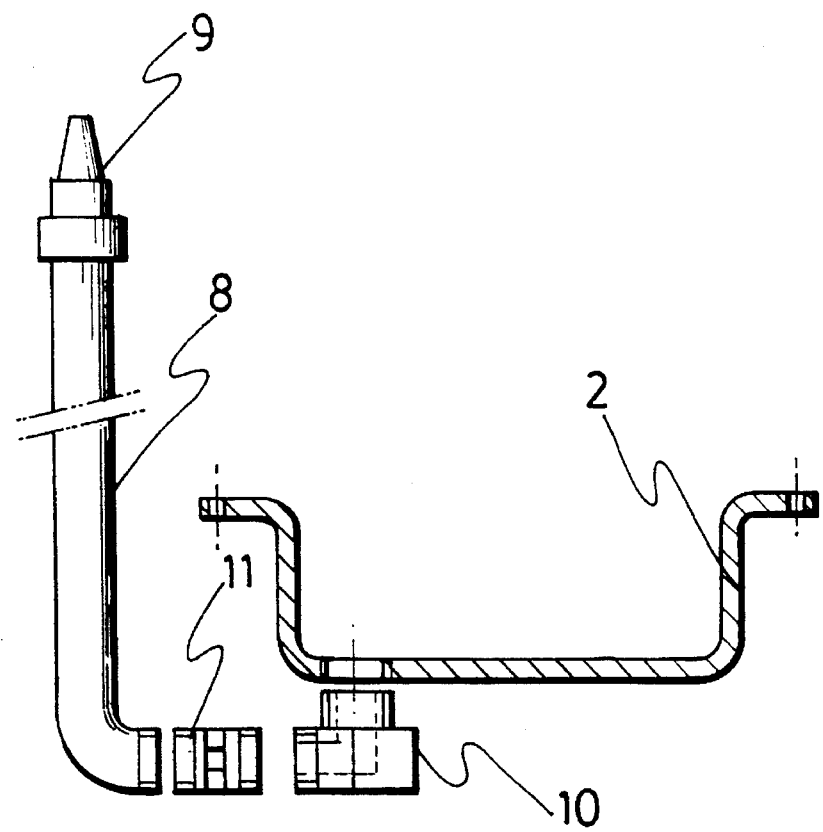
FIG. 3 is a more detailed albet schematic view of the coupling of a tube to the oil outlet of a conventional combustion engine.
Figure 4:
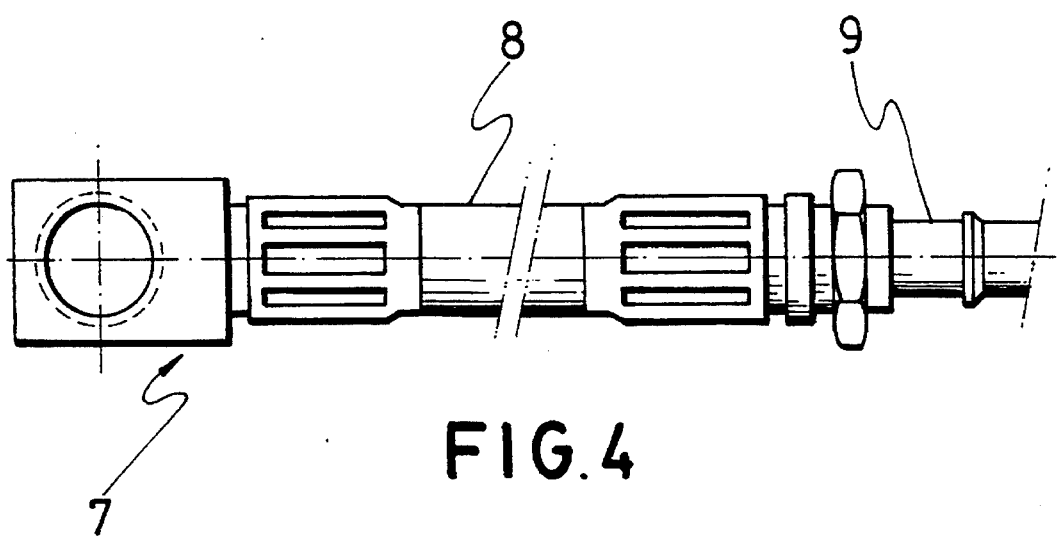
FIG. 4 is a detailed view of another embodiment of a coupling tube.
Figure 5:
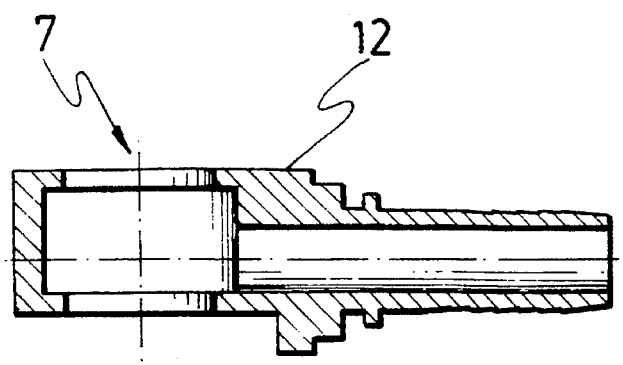
FIGS. 5, 6 and 7 are respectively a cross-section view, a side view in elevation and a longitudinal side view of the tube portion carrying a connecting means which is coupled to the oil outlet.
Figure 6:
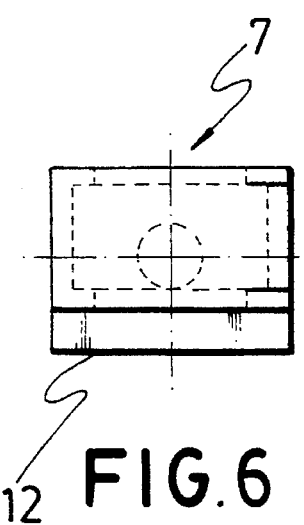
Figure 7:
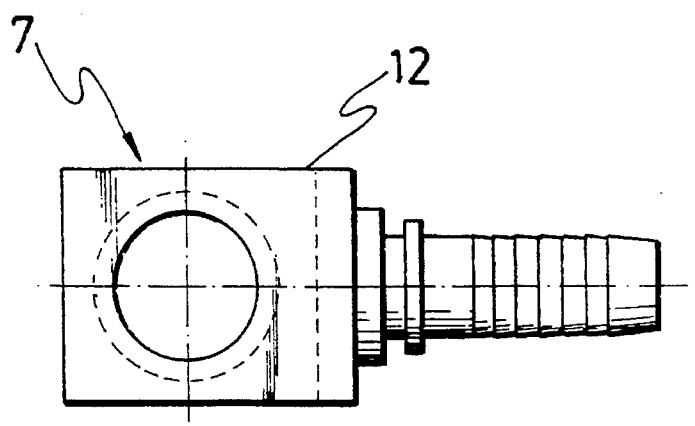
Figure 8:
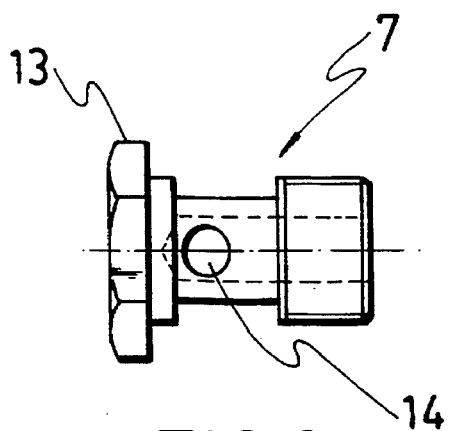
FIG. 8 is a partial view of the connecting means coupled to the oil outlet.

The connecting means comprises, as shown in FIG. 3, a first piece 10 having an internal elbow-shaped internal passageway screwed into the oil outlet by its upper threaded portion, connected to a coupling piece 11 by means of which said first piece is coupled to conduit or tube 8.

According to FIGS. 4 through 8, the various elements of the connecting means 7 are shown in a more detailed manner, namely an end portion 12 of the tube 8 and a screw 13 penetrating into the end portion 12 whereby the screw 13 has a radial channel 14 through which oil flows.

Figure 9:
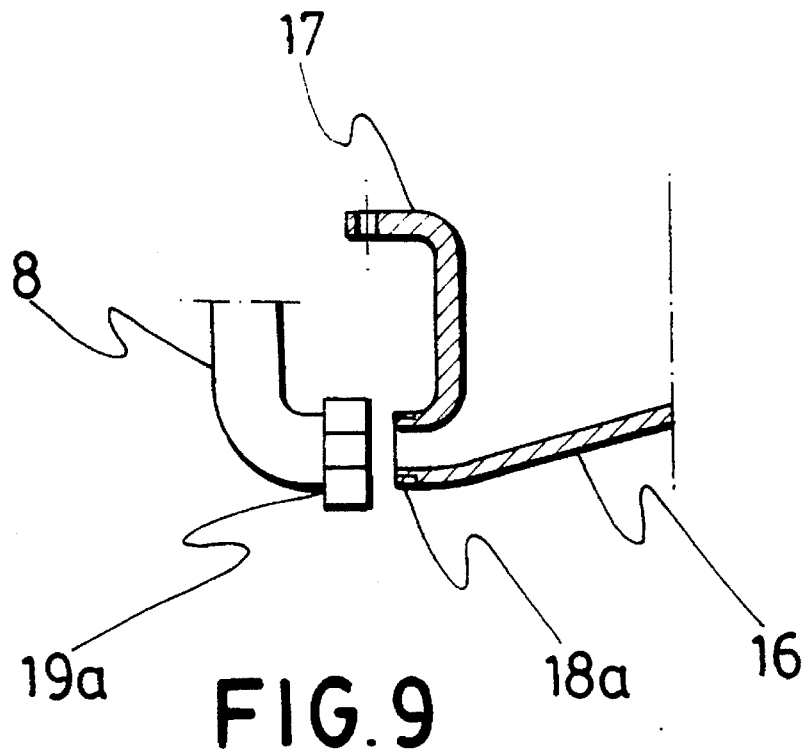
FIG. 9 is a schematic partial view of a modified crankcase which is suitable to be built into combustion engines in substitution of conventinal crankcase.

FIG. 9 shows a modified oil box allowing an optimum connection of the tube 8 wherein the bottom 16 of said crankcase 17 is inclined and extends at its lowest portion into an outlet 18a having an external thread to which the tube is coupled by means of a screw 19a.

Figure 10:
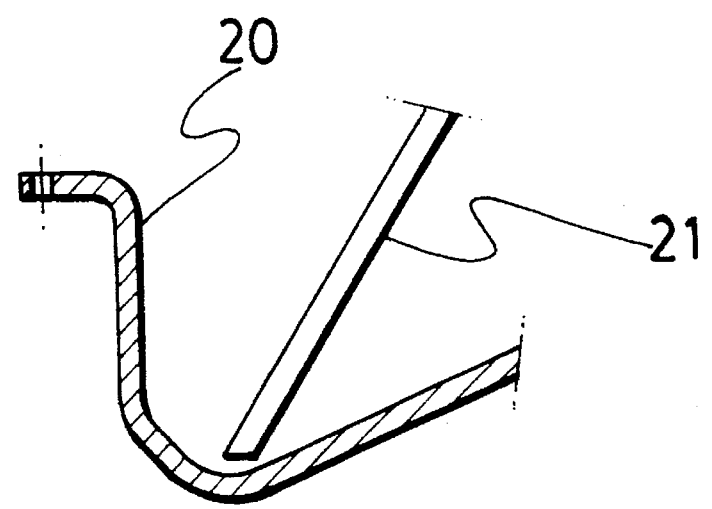
FIG. 10 is another embodiment of a modified crankcase.

FIG. 10 shows another possibility to provide the invention in the construction of new types of engines and crankcases, according to which the bottom of the crankcase 20 is also inclined and forms a pit into which a tube 21 fulfilling the funcitons of the tube 8 extends at its lower portion. The motor of FIG. 10 is further illustrated in FIG. 11 which figure also shows the arrangement of the oil filter which will be explained in more detail hereinbelow.

Figure 11:
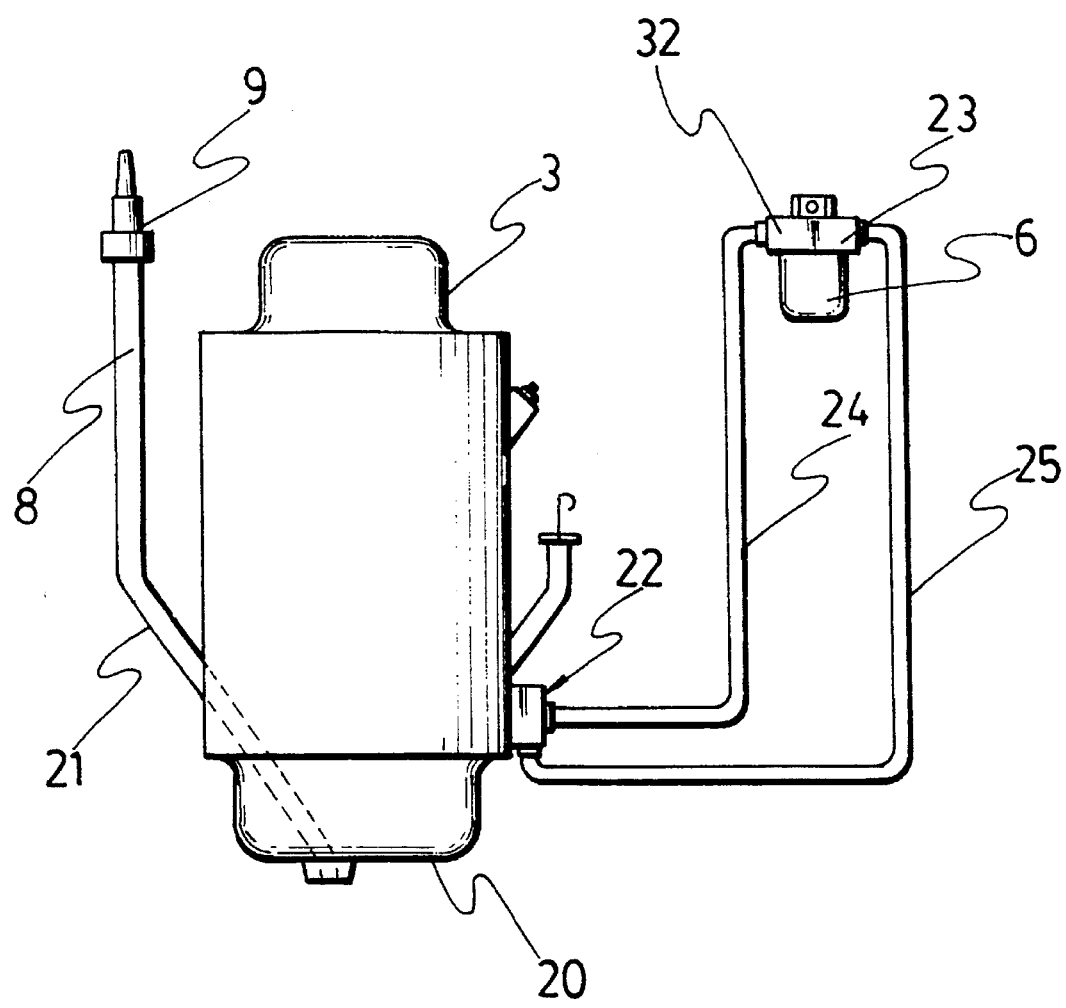
FIG. 11 is a similar view to that of FIG. 2 wherein the oil extraction and refilling tube is located within the engine block.

The oil filter arrangement 6, as shown in FIGS. 2 and 11 comprises a socket 22 placed at the site where the oil filter is conventionally located and a remote support 23 on which the oil filter 6 is mounted. The support 23 and the socket 22 are connected by ducts 24, 25 whereby one of these ducts connects the outlet of said socket 22 to the inlet of the oil filter 6 whilst the other duct connects the inlet of said socket with the outlet of the oil filter 6.

Figure 12:
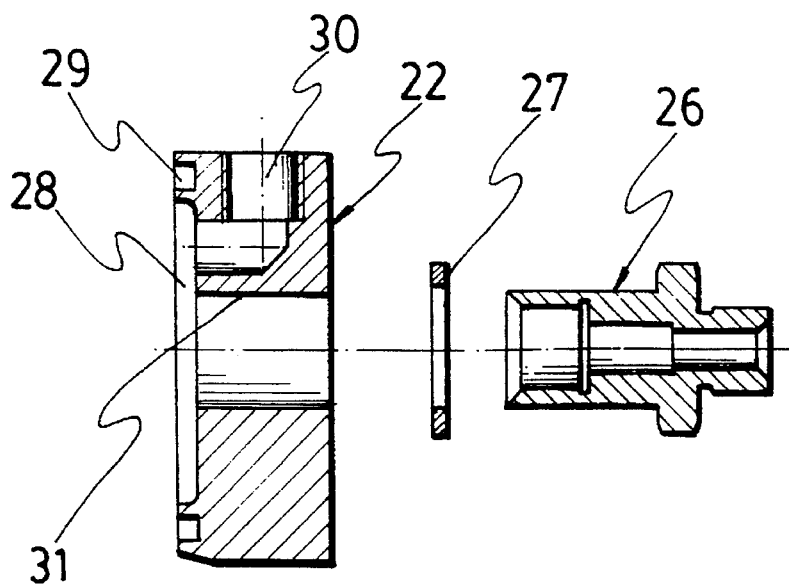
FIG. 12 is an exploded view in longitudinal section of the support applied to the site where the oil filter is located.
Figures 13, 14:
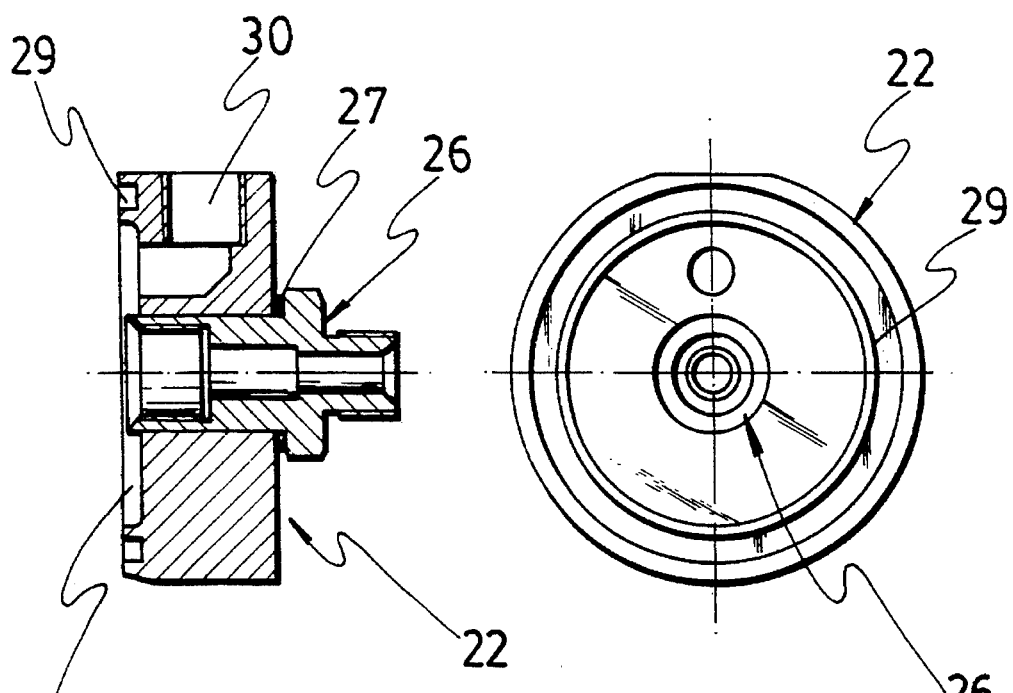
FIG. 13 is a sectioned view corresponding to FIG. 12.
FIG. 14 is a plan view of the left side portion of FIG. 13.

According to FIGS. 12 through 14, the socket 22 comprises a substantially central axial channel 31 which extrends in direction to the eingine into a hollow space 28 having a substantially wider diameter than the channel 31. Around but spaced from space 28 there is an annular recess 29 for housing a conventional sealing joint not in the figures. One end of an elbow-shaped further channel 30 in the socket extends into said space 28 whilst its other end is connected to the duct 25 (see FIG. 11.) A coupling piece 26 penetrates through the axial channel 31 and is screwed to the conventional threading for the oil filter at the engine block. Piece 26 has an axial channel and an annular portion being wider than channel 31 in said socket, whereby an annular sealing joint 27 is placed between said widened portion of the piece and the outer surface of said socket 22.

Figure 15:
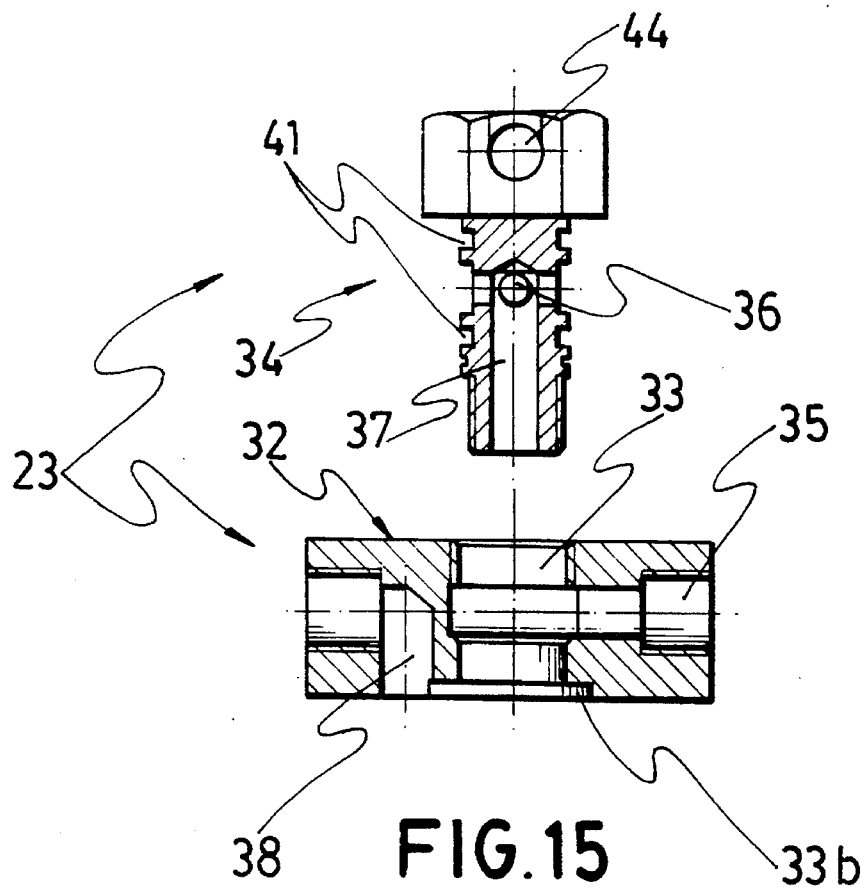
FIG. 15 is an exploded view in longitudinal section of the oil filter support means.
Figure 16:
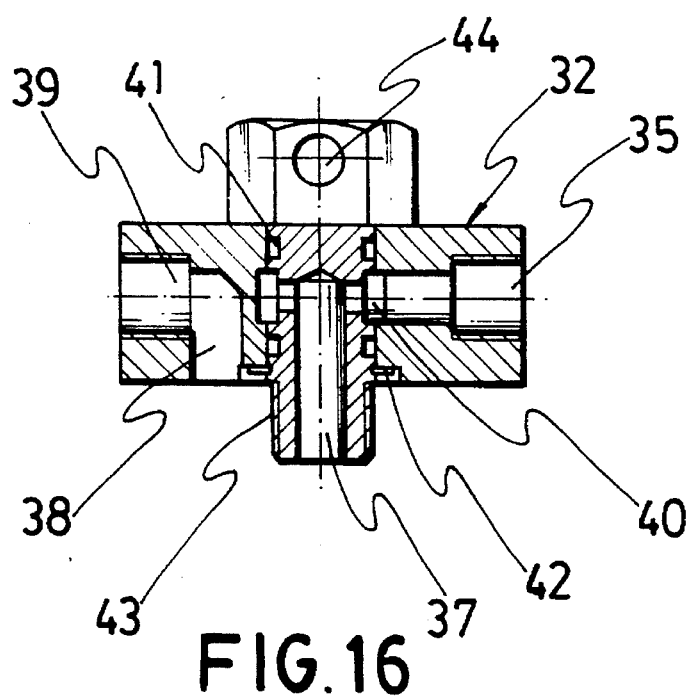
FIG. 16 is a sectioned view corresponding to FIG. 15 in an assembled state.
Figure 17:
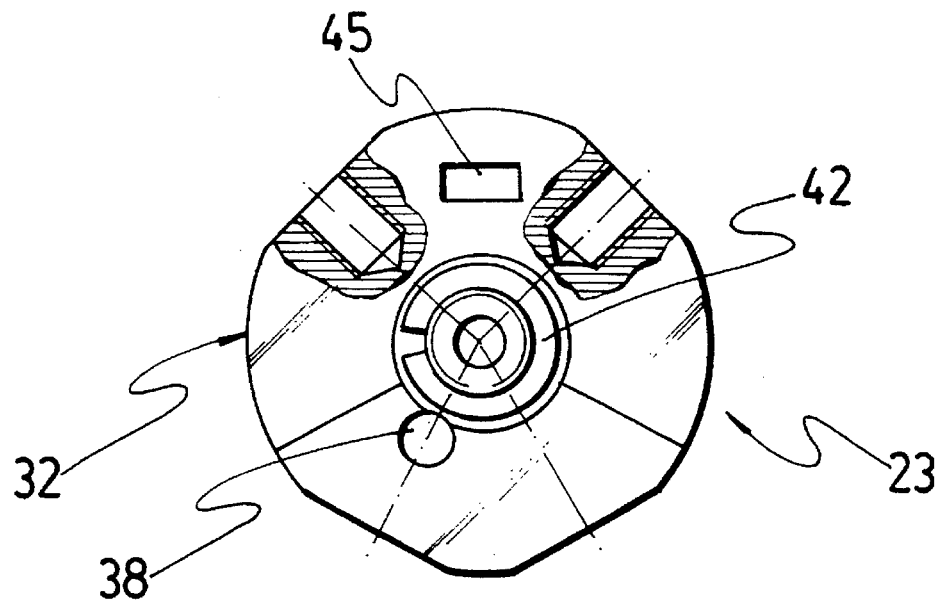
FIG. 17 is a lower plan view corresponding to FIG. 16.

Support 23 is shown in more detail in FIGS. 15 to 17. Support 23 comprises a horizontally placed disk-shaped plate 32 having an axial opening 33 through which a screw-type coupling means 34 extends. The lower portion of coupling means 34 is screwed by its threaded end 43 to the conventional oil filter 6 so that the filter is placed in a vertical inverted position. Thus, leaking of oil from the filter is avoided when the filter is disassembled. The plate 32 further comprises a radial channel 35 extending into the axial channel 33, and a bent channel 38, 39 the first portion 39 of which extends radially into the plate 32 body and the second portion bending towards the bottom surface of the plate 32 where it ends in an eccentric position.

The lower portion of channel 33 extends into a space 33b, having a larger diameter than that of the channel 33. The lower portion of the bent channel 38 also extends into space 33b. An intermediate portion of channel 33 can be conventionally surrounded by an annular chamber 40 into which said radial channel 35 extends.

The screw like coupling 34 comprises an axial central channel 37 the upper portion of which, when the filter 6 is mounted, coincides with annular chamber 40 into which the radial channel 36 extends. The duct 25 is coupled to channel 35 so that oil flows from channel 35 through the annular chamber 40 into the axial channel 37 in the coupling element and then into the oil filter 6. Once the oil has passed through the filter 6 it flows to space 33b and to bent channel 38 39 the radial portion of which is coupled to duct 24, and through said duct to said channel 30 of said socket 22.

The uppor portion of the coupling element 34 may have a peripheral recess 41 to house an O-ring seal (not shown.) To retain element 34 to the plate 32 a clip 42 or retainer washer can be affixed to its lower portion. The head of the coupling element 34 may further have a diametric bore 44 facilitating scrwing and unscrewing of the coupling element 34 to the filter 6 by simply passing a screw driver through bore 44.

FIG. 17 shows an optional sensor means 45 for detecting losses of load due to obstructions of the oil filter 6 by comparing the real pressure of the incoming dirty oil with that of the outgoing filtered oil and both with standard pressure values. Thus, for example correct pressures can be indicated by a green indicator means whilst incorrect pressure are indicative of an obstruction of the filter can be indicated by a red indicator means, whereby the sensor means 45 switches the indicator means from green to red.

Figure 18:
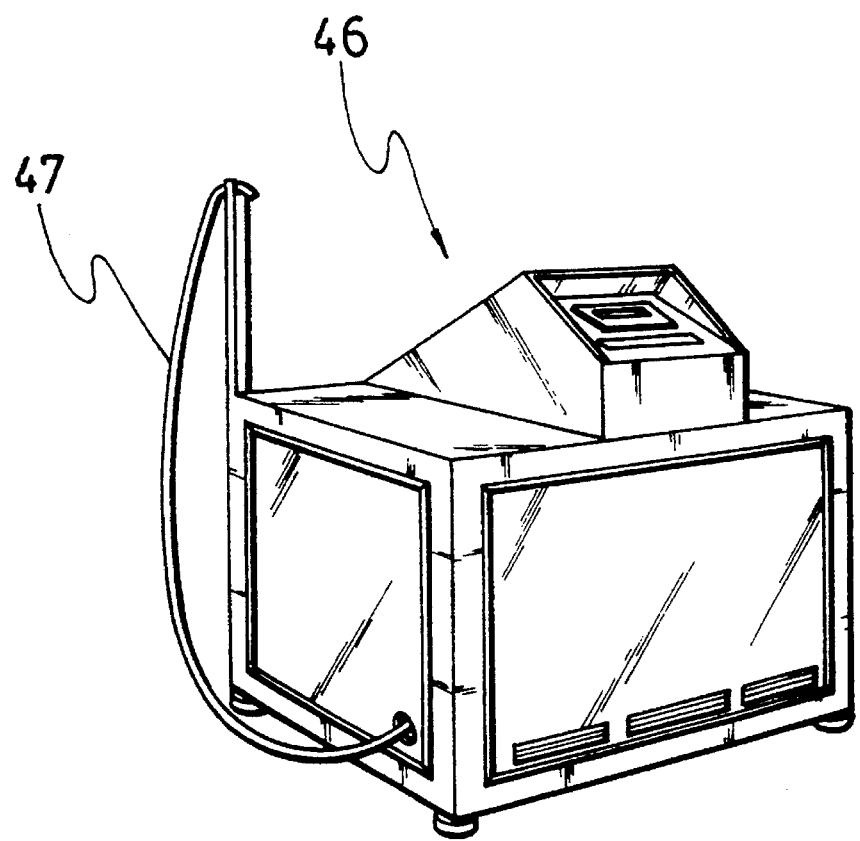
FIG. 18 is a view of the remote oil extraction and replacement unit.
Figure 19:
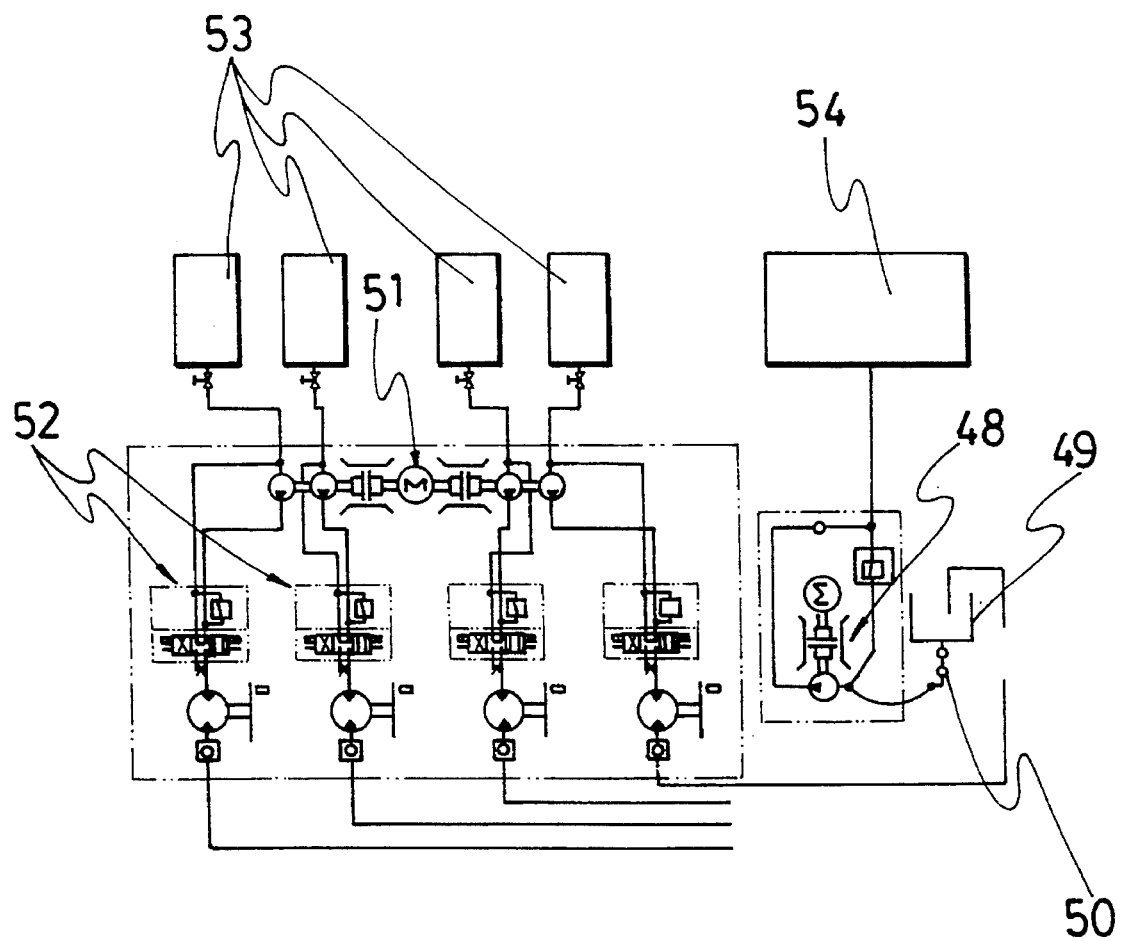
FIG. 19 is a schematic view of the hydraulic circuit of the remote unit of FIG. 18.

FIG. 18 shows the remote auxiliar unit 46 having a tube 47 which is connected to the upper end portion 9 of the tube shown in FIGS. 2 to 4 and 11. According to FIG. 19, unit 46 comprises a suction means 48 for extraction of used oil from the oil box 49 of the engine through said ducts 8 and 9. Waste oil is stored in tank 54.

Once waste oil has been extracted from the engine and thus air is suctioned instead of oil, this is detected by a rheostat means which transmits a signal to the control unit which stops action of the suction means. Optionally, suction can be restarted for another few seconds to extract oil which may drop into the oil box. Thereafter, the control unit activates the filling pump 51 to pump fresh oil from one of the oil tanks. The quantity and type of oil selected determines which of the electrovalves opens which of the tanks.

Figure 20:
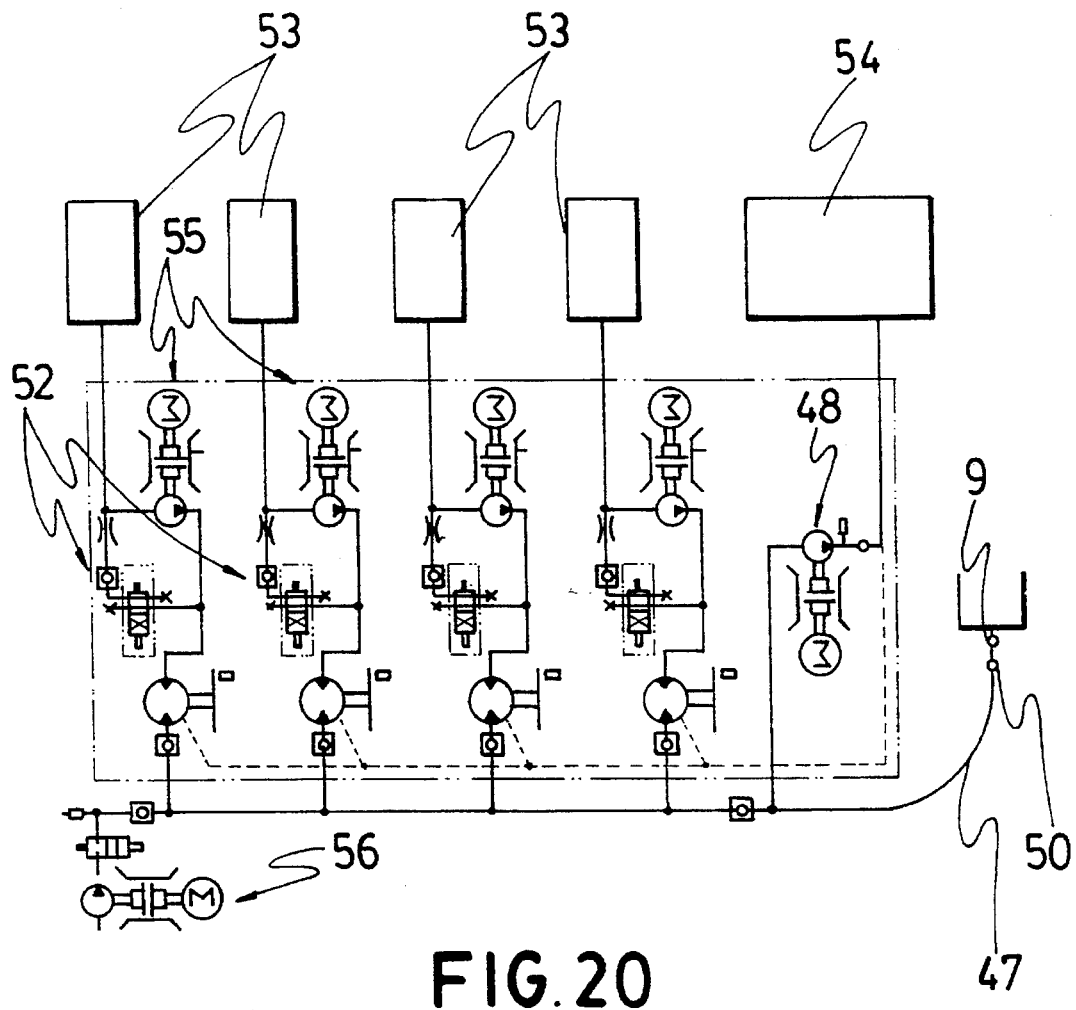
FIG. 20 is a schematic view of the hydraulic and of the cotnrol circuit according to an improvement of the invention comprising independent pumps and motors for each different type of oil to be supplied.

FIG. 20 schematically shows another embodiment of the remote unit 46. According to this embodiment the rapid socket 50 of the tube 47 is connected to the complementary socket 9 of the engine. An dependent pump 55 is provided for each of the oil tanks 53. A compressor means 56 cleans the ducts after each oil extraction and refilling phase.

One of the tanks 53 may contain a conventional motor cleansing liquid which may be circulated through the engine after waste oil has been extracted and before fresh oil is filled into the engine.

Practically all of the elements of the remote unit 46 are conventional and thus their combination is readily recognizable for any skilled person on the grounds of the disclosure provided hereinbefore.

I claim:

1. A system for expediting a change of motor oil in internal combustion engines which include a crankcase, said system comprising:

extraction means for extracting oil frown the crankcase;

filling means for filling oil into the crankcase;

control means for controlling the operations of extraction and filling of oil;

the extraction means and filling means including:

first duct means which have a first end fixed in the proximity of the lowest point at a bottom portion of the crankcase, said first duct means having a second end which has a first connecting means;

a second remote duct means releasably connectable by a second connecting means to said first connecting means of said first duct means;

a remote unit for extraction and filling of oil, said remote unit being connected to said second duct means;

wherein the control means includes means for carrying out a controlled suction of oil from the crankcase, through said first duct means and said second duct means to said remote unit, and means for carrying out a controlled filling of the crankcase supplying oil from the remote unit through said second duct means and said first duct means;

the remote unit being connected to at least a first tank for storing oil extracted from the crankcase, the remote unit being connected to at least a second tank from which oil is supplied to the crankcase, the remote unit includes means for controlling the quantities of oil extracted from and supplied to the crankcase respectively, and the remote unit includes means for processing and storing data relating to the quantity of oil extracted from and supplied to the crankcase, respectively; and the first duct means comprises one single duct through which oil is pumped during extraction from the crankcase as well as during filling of the crankcase.

2. A system according to claim 1, wherein the system further includes electronic data processing means for controlling the quantities of oil which are to be applied during filling of different types of motors.

3. A system according to claim 2, wherein the system further includes electronic data processing means for controlling the stock management of replacement oil.

4. A system according to claim 3, wherein the remote unit is connected to at least two tanks from which oil can be supplied to the crankcase, said at least two tanks containing different types of oil, whereby the remote unit includes means for selectively controlling the transfer of oil from one of said at least two tanks.

5. A system according to claim 4, wherein the first connecting means includes a male rapid plug being complementary to a female rapid plug forming part of the second connecting means.

6. A system according to claim 1, wherein the first duct means is connected to the crankcase by connecting means including a connector having a threaded upper portion by which it is threaded into an oil outlet of the crankcase and a channel extending axially through said upper portion.

7. A system according to claim 6, wherein the channel bends radially in a lower portion of said connector to form a lateral opening to which said first duct means is coupled.

8. A system according to claim 7, wherein said connector is connected to said first duct means by means of an intermediate connecting means having an axial channel, one end of which is coupled to said connector and another end of which is coupled to said first duct means.

9. A system according to claim 8, wherein the intermediate connecting means, the connector and the first duct means have threads being complementary to each other, the intermediate connecting means, the connector and the first duct means being connected by a threaded connection.

10. A system according to claims 1, wherein said first duct means extends internally through the crankcase and through an engine block.

11. A system according to claim 10, wherein a bottom of the crankcase forms a pit into which the First duct means extends.

12. A system according to claim 1, wherein the crankcase has an inclined bottom which extends at its lowest portion into a lateral outlet, said lateral outlet being coupled by a thread to a connecting element situated at the first end of the first duct means.

13. A system according to claim 1, wherein to facilitate an oil filter change the system further includes:

a conventional site of the oil filter;

a socket coupled to tile conventional site of the oil filter;

a remote support for supporting the oil filter;

third duct means for connecting the socket with the remote support;

the remote support being disposed in a position adequate for facilitating the change of the oil filter.

14. A system according to claim 13, wherein the remote support supports the oil filter in a vertical and inverted position.

15. A system according to claims 14, wherein the oil filter is fixed to the remote support by means of a threaded type coupling element which has a head with a diametric bore that permits its screwing and unscrewing by means of the introduction of a screwdriver.

16. A system according to claim 15, wherein the socket includes:

a substantially central axial channel extending in the direction towards the engine into a hollow space having a larger diameter than a diameter of said substantially central axial channel;

an elbow shaped channel having a first portion which extends radially into said socket and a second portion extending axially but eccentrically into said hollow space;

a bushing extending through said substantially central axial channel, said bushing having an end portion with a thread by which the bushing is screwed to a conventional outlet for the oil filter at the engine and another end portion by which the bushing is connected to a first duct of said third duct means;

a second duct of said third duct means being connected by one of its ends to the first portion of the elbow shaped channel.

17. A system according to claim 16, wherein the support includes:

a plate having a substantially central first axial channel, said first axial channel being surrounded approximately at a middle portion by an annular chamber, a radial channel extending from one side of said plate into said annular chamber; and an elbow shaped channel with a first portion radially extending into said plate and a second inner portion which extends parallel to said substantially central first axial channel of the plate such that the second portion of the elbow shaped channel as well as the substantially central first axial channel ends in a space whose diameter is larger than the diameter of the substantially central first axial channel;

the screw type coupling element which extends through said substantially central first axial channel in said plate, and the lower portion of which protrudes from the bottom surface of said plate and having a thread by which it is screwed to a conventional inlet of the oil filter, said screw type coupling element further having an axial channel which is open at its bottom end and the upper portion of which has an opening connecting with said annular chamber:

said radial channel of the plate being connected by means of said second duct of said third duct means to the first portion of the elbow shaped channel of the socket, the first portion of the elbow shaped channel of the plate being connected by means of said first duct of said third duct means to said bushing in said socket, whereby oil can circulate from said bushing through said first duct of said third duct means towards the support, through said oil filter and through said second duct of said third duct means back to said socket.

18. A system according to claim 1, wherein the remote unit includes means for detecting when air enters during suction of oil from the crankcase, and means for transmitting a signal when detecting that air enters, as well as means for, when receiving said signal, interrupting the suction of oil for a few seconds.

19. A system according to claim 18, wherein the system includes the restarting of the suction of oil temporarily after said suction has been stopped as a consequence of air entering, thereby extracting oil that might have dropped to the bottom of the crankcase.

20. A system according to any of claims 19, wherein an independent pump is provided for each of the tanks for oil to be supplied to the crankcase.

21. A system according to any of claims 19, further comprising a compressor for cleaning the ducts after each oil extraction and refilling phase.

22. A system according to any of claims 19, wherein the system further includes means for circulating a conventional motor cleansing liquid through the engine after oil has been extracted from the crankcase but before oil has been supplied to it.

* * * * *